March 7, 1961 R. V. MONZINGO 2,973,588

EDUCATIONAL DEVICE

Filed March 14, 1960 2 Sheets-Sheet 1

INVENTOR

Reginald V. Monzingo

BY [signature]

ATTORNEY

March 7, 1961 R. V. MONZINGO 2,973,588

EDUCATIONAL DEVICE

Filed March 14, 1960 2 Sheets-Sheet 2

INVENTOR
Reginald V. Monzingo

BY J. Bruce Rymer Jr.

ATTORNEY

United States Patent Office 2,973,588

Patented Mar. 7, 1961

2,973,588

EDUCATIONAL DEVICE

Reginald V. Monzingo, Austin, Tex.
(Box 23, Chireno, Tex.)

Filed Mar. 14, 1960, Ser. No. 14,737

1 Claim. (Cl. 35—35)

Figure 1:
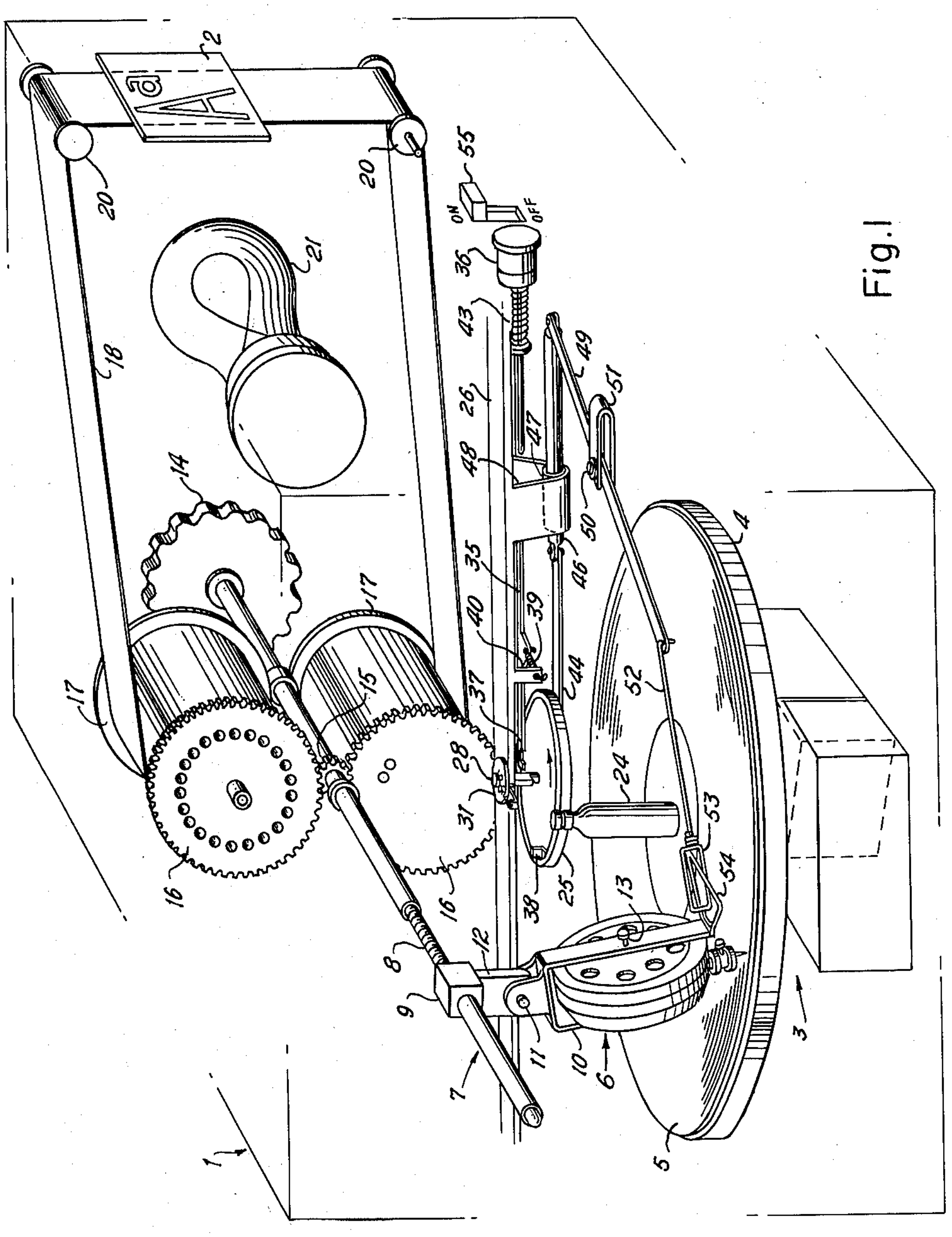

This invention relates to an educational device, and it concerns more particularly an electro-mechanical teaching device having means for displaying selected portions of a translucent tape having information printed thereon, for visual observation, and having means for reproducing sounds corresponding to said selected portions, as recorded on a disc record, simultaneously with the displaying of the printed information, at the election of the operator.

The device of the invention is designed for use in conjunction with interchangeable tapes and records, and is capable of teaching a variety of information which ordinarily is memorized and usually requires a human instructor, such as the alphabet, the counting system, simple arithmetic, and the rudiments of foreign languages. The device advantageously may be used by pre-school age children, as well as children of school age and others requiring special instruction, and tourists desiring to familiarize themselves with foreign languages.

An object of the invention is to provide an electro-mechanical teaching device comprising, in combination, a translucent tape having information printed thereon, means for supporting the tape for longitudinal movement, manually operable means for adjusting longitudinally the position of the tape relative to a fixed point whereby selected portions of the tape are adapted to be displayed, one at a time, for visual observation, a record player having a turntable and a tone arm, a disc record operatively positioned on the turntable having recorded thereon sounds corresponding to the information printed on the tape, and means for synchronizing the position of the tape relative to the fixed point with the position of the tone arm relative to the grooves of the record whereby selected sounds corresponding to the selected printed information are adapted to be reproduced simultaneously with the displaying of the printed information.

Another object of the invention is to provide, in the structure described, manually actuated, cam operable means, responsive to rotation of the turntable, engageable with the tone arm, at the election of the operator, whereby the needle of the tone arm is adapted to be operatively positioned relative to the grooves of the record for a predetermined time sufficient to produce such selected sounds.

The invention comprises, in combination with a record player having a turntable adapted to receive a disc record, and having a unitary tone arm and speaker assembly including a needle engageable with a record operatively positioned on the turntable, a cabinet enclosing the record player, a rotatable shaft disposed horizontally within the cabinet, and having one of its ends extending across the turntable, and spaced above it, said end of the shaft having a threaded portion positioned opposite one side of the turntable, a nut on the shaft, a clevis depending from the nut and embracing the tone arm and speaker assembly, which depends therefrom, the clevis being movable pivotally about a horizontal axis parallel to and below the shaft and the tone arm and speaker assembly being capable of a limited rotative movement relative to the clevis, a knob on the shaft whereby the shaft is rotatable manually, a pinion gear on the shaft, a pair of discs positioned on opposite sides of the shaft having peripheral gear teeth engageable with the pinion gear whereby the discs are rotatable in opposite directions, and means on the discs engageable with a pair of spools having a printed tape wound thereon, whereby the spools are rotatable with the discs, to thereby wind the tape on and off the respective spools, simultaneously with rotation of the shaft, whereby the nut is movable longitudinally relative to the shaft and the tone arm and speaker assembly is movable across the turntable.

The invention further includes, in the structure described, a spindle removably secured to the turntable at its center and normally extending downwardly thru a central opening in the record and extending upwardly above it, a rotatable cam wheel having means supporting it for frictional engagement of its peripheral surface with the spindle whereby the cam wheel is adapted to be driven by the spindle, the cam wheel having an indentation in one side thereof whereby it is adapted to be disengaged from the spindle upon positioning said indentation opposite the spindle, spring means normally biasing the cam wheel in frictional engagement with the spindle, a manually operable plunger normally disposed horizontally, tangentially relative to the cam wheel, for reciprocal movement relative thereto, the cam wheel and the plunger having mutually engaging means whereby the cam wheel is rotated, whereby its peripheral edge frictionally engages the spindle, in response to longitudinal movement of the plunger in one direction, spring means normally biasing the plunger laterally, in the direction of the cam wheel, whereby said mutually engaging means is engaged, to thereby secure the cam wheel against rotation independently of the plunger, cam operable means responsive to further longitudinal movement of the plunger in said one direction acting on the plunger to disengage the plunger from the cam wheel, spring means normally biasing the plunger in a direction opposite said one direction, and linkage responsive to rotation of the cam wheel acting on the clevis to move it pivotally, to thereby lower the tone arm and speaker assembly from a raised position, in which the needle is disengaged from the record, to a lowered position in which the needle operatively engages the record, and thereafter raise said assembly, whereby the needle is again disengaged from the record, after a predetermined time has elapsed.

Figures 2, 3:
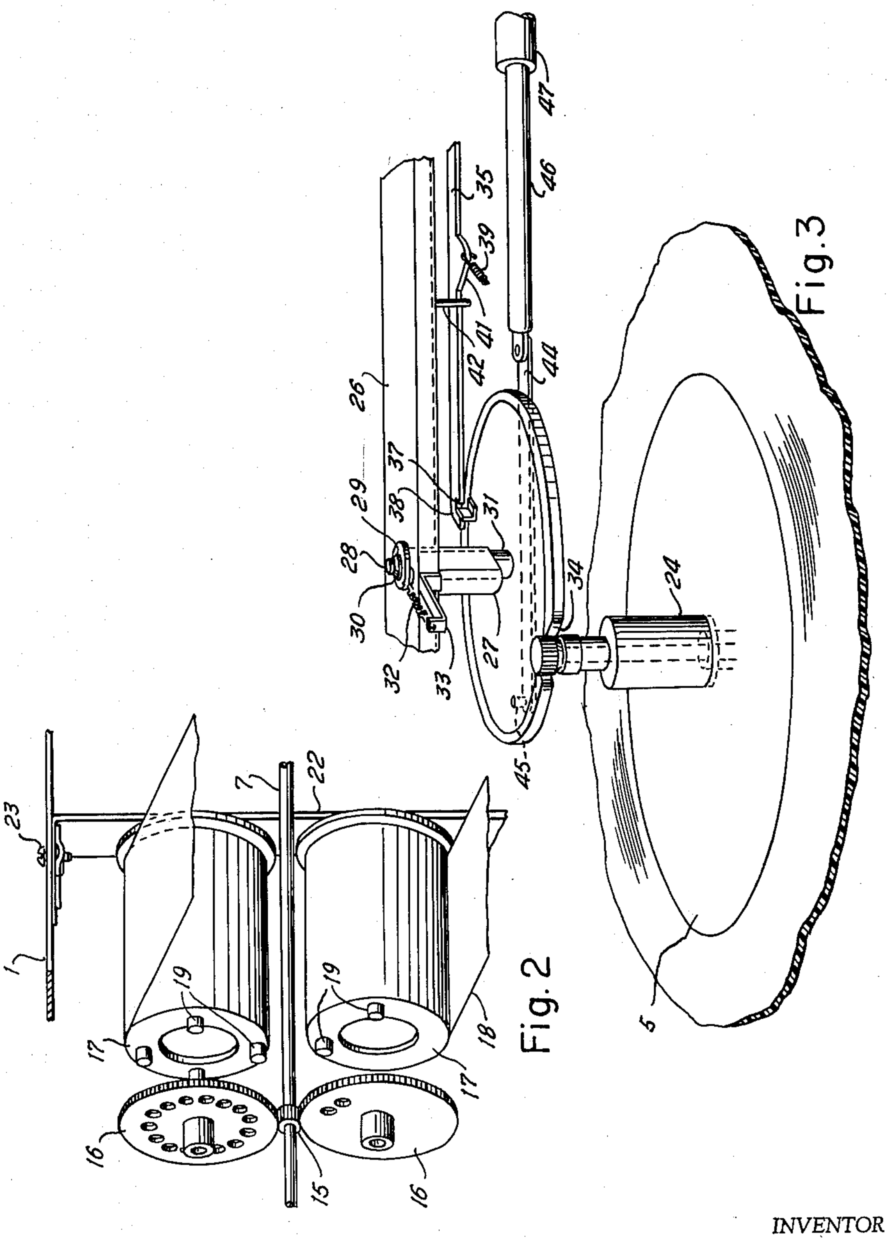

The invention will be readily understood by referring to the following description and the accompanying drawing, in which:

Fig. 1 is a perspective view showing diagrammatically an educational device embodying the invention; and Figs. 2 and 3 are fragmentary perspective views showing portions thereof on a larger scale.

Referring to the drawing, the numeral 1 designates generally a cabinet, shown fragmentarily, which may be of any suitable construction. The cabinet 1 has a window 2 therein, for use as hereinafter described.

A record player, which is indicated generally by the numeral 3, is enclosed within the cabinet 1. The record player 3 is electrically operable, and has a turntable 4 adapted to receive a disc record 5, one of which is operatively positioned thereon. The record player 3 also has a unitary tone arm and speaker assembly 6, which includes a needle engageable with the grooves of the record 5.

A rotatable shaft 7, which is disposed horizontally within the cabinet 1, has one of its ends extending across the turntable 4, and spaced above it. Said end of the shaft 7 has a threaded portion 8 positioned opposite the grooves on one side of the turnable 4, and coextensive therewith.

A nut 9, which is received on the threaded portion 8 of the shaft 7, is movable longitudinally relative to the shaft 7, transversely relative to the grooves of the record 5, upon rotation of the shaft 7.

A clevis 10, opposite sides of which embrace the tone arm and speaker assembly 6, is pivotally connected, as at 11, to a lug 12 which depends from the nut 9 and forms a downward extension thereof, whereby the clevis 10 depends from the nut 9 and is movable pivotally about a horizontal axis parallel to and below the shaft 7.

The tone arm and speaker assembly 6 is rotatively connected, as at 13, to opposite sides of the clevis 10, whereby the tone arm and speaker assembly 6 is capable of a limited rotative movement relative to the clevis 10.

A knob 14 is connected to the end of the shaft 7 opposite the threaded portion 8, exteriorly of the cabinet 1, whereby the shaft 7 is rotatable manually.

A pinion gear 15, which is connected to the shaft 7 and is rotatable therewith, is positioned between the threaded portion 8 of the shaft 7 and the knob 14. A pair of discs 16, which are rotatably mounted on opposite sides of the shaft 7, have peripheral gear teeth engageable with the pinion gear 15 whereby the discs 16 are rotatable in opposite directions.

A pair of spools 17, which have a translucent printed tape 18 wound thereon, each have a plurality of circumferentially spaced pegs 19 extending longitudinally outwardly from one of its ends for selective engagement with corresponding circumferentially spaced holes which are provided therefor in one of the discs 16, whereby the spools 17 are rotatable with the dics 16, to thereby wind the tape 18 on and off the respective spools 17, simultaneously with rotation of the shaft 7, whereby the nut 9 is movable longitudinally relative to the shaft 7 and the tone arm and speaker assembly 6 is movable across the turntable 4.

Opposite ends of the tape 18 are wound on the spools 17, and an intermediate portion thereof is strung over a pair of idler rolls 20 positioned above and below the window 2, within the cabinet 1, whereby the tape 18 is movable longitudinally relative to the window 2, and selected portions of the tape 18 are adapted to be displayed opposite the window 2 upon turning the knob 14.

A lamp 21 is positioned behind the tape 18, opposite the window 2, whereby the tape 18 may be illuminated as it is displayed opposite the window 2.

The spools 17 and the tape 18 are interchangeable with other like spools and tapes. The spools 17 are secured in engagement with discs 16, whereby they are rotatably supported thereon and turn therewith, by a vertically extending bar 22, which extends across the ends of the spools 17 opposite the pegs 19, in abutting engagement therewith, and is adjustably secured to the cabinet 1, as at 23, whereby it may be advanced and retracted relative to the discs 16.

A spindle 24 is removably secured to the turntable 4 at its center and normally extends downwardly thru a central opening in the record 5 and extends upwardly above it.

A rotatable cam wheel 25 is supported as hereinafter described for frictional engagement of its peripheral surface with the spindle 24 whereby the cam wheel 25 is adapted to be driven by the spindle.

A horizontally extending bar 26, which extends across the peripheral edge of the turntable 4 and is spaced above it, provides a fixed support within the cabinet 1. A lug 27 is attached to the bar 26 and depends therefrom. A pin 28, which is connected to the cam wheel 25 at its center and extends upwardly therefrom, is passed thru a slot therefor in the bar 26 and the lug 27, and has a washer 29 secured to its upper end, above the bar 26, by a cotter pin 30. A bushing 31, which surrounds the pin 28 and is movable laterally in the slot, has an outwardly flanged upper end which is disposed between the bar 26 and the washer 29.

A tension spring 32 is connected at its ends to the bushing 31 and an arm 33, which extends horizontally outwardly from one edge of the bar 26, whereby the cam wheel 25 is normally biased in frictional engagement with the spindle 24.

The cam wheel 25 has an indentation 34 in its peripheral edge adjacent one side thereof whereby it is adapted to be disengaged from the spindle 24 upon positioning the indentation 34 opposite the spindle 24.

A plunger 35, which has a knob 36 on one of its ends, exteriorly of the cabinet 1, is normally disposed horizontally, substantially parallel to and below the bar 26, tangentially relative to the cam wheel 25, for reciprocal movement relative thereto.

The plunger 35 has an indentation 37 on the end thereof opposite the knob 36 for engagement with an upstanding lug 38 connected to the cam wheel 25 adjacent its peripheral edge, whereby the cam wheel 25 is adapted to be rotated, in response to longitudinal movement of the plunger 35 in an inward direction, sufficiently to cause the indentation 34 to pass the spindle 24. The peripheral edge of the cam wheel 25 then frictionally engages the spindle 24, whereby the cam wheel 25 is rotated with the spindle 24.

A tension spring 39, which is connected at its ends to the plunger 35 and a lug 40 depending from the bar 26, normally biases the plunger 35 laterally, in the direction of the cam wheel 25, whereby the indentation 37 of the plunger 35 engages the upstanding lug 38 of the cam wheel 25, to thereby secure the cam wheel 25 against rotation independently of the plunger 35.

The plunger 35 has a cam surface 41 on one edge thereof which is engageable with a lug 42 depending from the bar 26, to thereby disengage the plunger 35 from the cam wheel 25, in response to further longitudinal movement of the plunger 35 in an inward direction.

A compression spring 43, which surrounds the plunger 35 and is positioned between the cabinet 1 and the knob 36, normally biases the plunger 35 longitudinally outwardly whereby it resists longitudinal movement thereof in an inward direction in response to pressure applied to the knob 36.

A link 44, which is pivotally connected to the under side of the cam wheel 25, eccentrically thereof, as at 45, is pivotally connected at its opposite end to one end of a rod 46, which is movable reciprocally in a tubular bearing 47 therefor supported by a bracket 48 depending from the bar 26.

A lever 49, which is fulcrumed intermediate its ends on a pin 50, which loosely engages an opening therefor in a supporting bracket 51, whereby the pin 50 is capable of a limited lateral motion upon pivotal movement of the lever 49, is connected at one end to the end of the rod 46 opposite the link 44. The opposite end of the lever 49 is connected to one end of a wire link 52. The end of the wire link 52 opposite the lever 49 has a loop 53 therein. The wire loop 53, which is elongated, is passed thru a triangular wire loop 54 which has one of its corners rigidly connected to one side of the clevis 10 adjacent its lower end.

The linkage above described, which is responsive to rotation of the cam wheel 25, acts on the clevis 10 to move it pivotally, to thereby lower the tone arm and speaker assembly 6 from a raised position, in which the needle thereof is disengaged from the record 5, to a lowered position in which the needle operatively engages the grooves of the record 5, and thereafter raise the tone arm and speaker assembly 6 whereby the needle is again disengaged from the record 5, after a predetermined time has elapsed.

The numeral 55 designates a switch for starting and stopping the record player 3.

In the operation of the apparatus above described, by manipulation of the knob 14 the rotative positions of the spools 17 are adjusted whereby a selected portion of the tape 18 appears behind the window 2. Simultaneously the position of the needle of the tone arm and speaker assembly 6 is adjusted radially relative to the record 5 by the action of the threaded portion 8 of the shaft 7 on the nut 9, so that the needle is engageable with a portion of the record 5 corresponding to the selected portion of the tape 18 upon lowering the tone arm and speaker assembly 6.

The record player 3 is started by means of the switch 55. At the same time the plunger 35 is moved to the left, as shown in Fig. 1, by means of the knob 36, whereby the indentation 37 on the opposite end of the plunger 35 engages the lug 38 on the cam wheel 25, and the cam wheel 25 is rotated sufficiently to cause the indentation 34 of the cam wheel 25 to pass the spindle 24, which rotates with the turntable 4 and frictionally engages the peripheral edge of the cam wheel 25 whereby the cam wheel 25 turns with the spindle 24.

The needle of the tone arm and speaker assembly 6 is automatically lowered in operative engagement with the record 5, and thereafter lifted out of engagement therewith after a predetermined time has elapsed, by the action of linkage including the link 44, which has one of its ends pivotally connected to the under side of the cam wheel 25, eccentrically thereof, as above described.

The invention may be modified in various ways without departing from the spirit and scope thereof.

I claim:

In combination with a record player having a turntable adapted to receive a disc record, and having a unitary tone arm and speaker assembly including a needle engageable with a record operatively positioned on the turntable, a cabinet enclosing the record player, a rotatable shaft disposed horizontally within the cabinet, and having one of its ends extending across the turntable, and spaced above it, said end of the shaft having a threaded portion positioned opposite one side of the turntable, a nut on the shaft, a clevis depending from the nut and embracing the tone arm and speaker assembly, which depends therefrom, the clevis being movable pivotally about a horizontal axis parallel to and below the shaft and the tone arm and speaker assembly being capable of a limited rotative movement relative to the clevis, a knob on the shaft whereby the shaft is rotatable manually, a pinion gear on the shaft, a pair of discs positioned on opposite sides of the shaft and having peripheral gear teeth engageable with the pinion gear whereby the discs are rotatable in opposite directions, means on the discs engageable with a pair of spools having a translucent printed tape wound thereon, whereby the spools are rotatable with the discs, to thereby wind the tape on and off the respective spools, simultaneously with rotation of the shaft, whereby the nut is movable longitudinally relative to the shaft and the tone arm and speaker assembly is movable across the turntable, a spindle removably secured to the turntable at its center and normally extending downwardly thru a central opening in the record and extending upwardly above it, a rotatable cam wheel having means supporting it for frictional engagement of its peripheral surface with the spindle whereby the cam wheel is adapted to be driven by the spindle, the cam wheel having an indentation in its peripheral edge adjacent one side thereof whereby it is adapted to be disengaged from the spindle upon positioning said indentation opposite the spindle, spring means normally biasing the cam wheel in frictional engagement with the spindle, a manually operable plunger normally disposed horizontally, tangentially relative to the cam wheel, for reciprocal movement relative thereto, the cam wheel and the plunger having mutually engaging means whereby the cam wheel is rotated, whereby its peripheral edge frictionally engages the spindle, in response to longitudinal movement of the plunger in one direction, spring means normally biasing the plunger laterally, in the direction of the cam wheel, whereby said mutually engaging means is engaged, to thereby secure the cam wheel against rotation independently of the plunger, cam operable means responsive to further longitudinal movement of the plunger in said one direction acting on the plunger to disengage the plunger from the cam wheel, spring means normally biasing the plunger in a direction opposite said one direction, and linkage responsive to rotation of the cam wheel acting on the clevis to move it pivotally, to thereby lower the tone arm and speaker assembly from a raised position, in which the needle is disengaged from the record, to a lowered position in which the needle operatively engages the record, and thereafter raise said assembly, whereby the needle is again disengaged from the record, after a predetermined time has elapsed.

References Cited in the file of this patent

UNITED STATES PATENTS

| | | |
|---|---|---|
| 1,655,510 | Runyan | Jan. 10, 1928 |
| 2,412,061 | Quidas | Dec. 3, 1946 |

FOREIGN PATENTS

| | | |
|---|---|---|
| 299,334 | Great Britain | Oct. 19, 1928 |